United States Patent
Bartsch et al.

(10) Patent No.: US 7,921,417 B2
(45) Date of Patent: Apr. 5, 2011

(54) METHOD AND COMPUTER SYSTEM FOR ACTIVATION OF SOURCE FILES

(75) Inventors: Eduard Bartsch, Hochenhein (DE); Joerg Lienhardt, Walldorf (DE)

(73) Assignee: SAP AG, Walldorf (DE)

( * ) Notice: Subject to any disclaimer, the term of this patent is extended or adjusted under 35 U.S.C. 154(b) by 1299 days.

(21) Appl. No.: 10/536,634

(22) PCT Filed: Feb. 13, 2004

(86) PCT No.: PCT/EP2004/001382
§ 371 (c)(1),
(2), (4) Date: Jun. 15, 2006

(87) PCT Pub. No.: WO2004/088516
PCT Pub. Date: Oct. 14, 2004

(65) Prior Publication Data
US 2006/0248517 A1 Nov. 2, 2006

(30) Foreign Application Priority Data
Apr. 1, 2003 (EP) .................................. 03007527

(51) Int. Cl.
*G06F 9/45* (2006.01)
(52) U.S. Cl. ......... 717/140; 717/139; 717/145; 717/146
(58) Field of Classification Search .......... 717/140–145; 414/140
See application file for complete search history.

(56) References Cited

U.S. PATENT DOCUMENTS

| | | | |
|---|---|---|---|
| 4,951,192 A | 8/1990 | Chase, Jr. et al. | |
| 5,732,192 A * | 3/1998 | Malin et al. | 703/2 |
| 5,758,160 A | 5/1998 | McInerney et al. | |
| 5,764,989 A * | 6/1998 | Gustafsson et al. | 717/129 |
| 5,854,932 A | 12/1998 | Mariani et al. | |
| 5,956,513 A | 9/1999 | McLain, Jr. | |
| 6,567,838 B1 * | 5/2003 | Korenshtein | 718/100 |
| 6,898,793 B1 * | 5/2005 | Yamamoto et al. | 719/317 |
| 6,983,294 B2 * | 1/2006 | Jones et al. | 1/1 |
| 6,983,457 B2 * | 1/2006 | Mitsumori et al. | 717/145 |
| 7,065,756 B2 * | 6/2006 | Barsness et al. | 717/148 |

(Continued)

FOREIGN PATENT DOCUMENTS
EP 1202171 A2 3/2001

OTHER PUBLICATIONS

Title: File server system reliability versus level of inactive and active parallel standby redundancy, author: Liechenstein, Dated: Oct. 2, 1994, source: IEEE.*

(Continued)

*Primary Examiner* — Chameli C Das
(74) *Attorney, Agent, or Firm* — Blakely Sokoloff Taylor & Zafman

(57) ABSTRACT

Method and computer system for activation of source files. A source file repository stores a plurality of active source files belonging to a component. A central compilation service receives an activation request for at least one inactive source file of the component. In response to the activation request the central compilation service compiles the component using the at least one inactive source file and, in case the compilation is successfully completed, initiates a transfer of the at least one inactive source file to the plurality of active source files.

28 Claims, 5 Drawing Sheets

U.S. PATENT DOCUMENTS

| | | | |
|---|---|---|---|
| 7,146,489 B2 * | 12/2006 | Dowling | 712/207 |
| 7,260,798 B2 * | 8/2007 | Gupta et al. | 716/5 |
| 7,304,984 B2 * | 12/2007 | Butler et al. | 370/352 |
| 7,562,252 B2 * | 7/2009 | Arai | 714/10 |
| 7,613,744 B2 * | 11/2009 | Cannon et al. | 1/1 |
| 7,647,481 B2 * | 1/2010 | Rychlik | 712/220 |
| 7,800,502 B2 * | 9/2010 | Naccache | 340/572.3 |
| 2002/0040429 A1 * | 4/2002 | Dowling | 712/228 |
| 2002/0087845 A1 * | 7/2002 | Dowling | 712/228 |
| 2002/0184611 A1 * | 12/2002 | Endejan | 717/113 |
| 2004/0040012 A1 * | 2/2004 | Barsness et al. | 717/123 |
| 2004/0205736 A1 * | 10/2004 | Mitsumori et al. | 717/142 |
| 2005/0138081 A1 * | 6/2005 | Alshab et al. | 707/200 |
| 2005/0144601 A1 * | 6/2005 | Lo | 717/140 |
| 2005/0198606 A1 * | 9/2005 | Gupta et al. | 716/18 |
| 2005/0204058 A1 * | 9/2005 | Philbrick et al. | 709/238 |
| 2006/0036889 A1 * | 2/2006 | Arai | 714/1 |
| 2006/0074733 A1 * | 4/2006 | Shukla et al. | 705/8 |
| 2006/0155973 A1 * | 7/2006 | Soltis | 712/228 |
| 2007/0061790 A1 * | 3/2007 | Kay et al. | 717/145 |
| 2010/0070742 A1 * | 3/2010 | Dowling | 712/225 |

OTHER PUBLICATIONS

"European Office Action", Office Action for European Application No. 03 007 527.9 mailed Jul. 7, 2008. 5 pages.

"European Search Report", European Search Report mailed Apr. 5, 2004 for EP Patent Application No. 03 007 527.9. 4 pages.

"PCT Search Report and Written Opinion", Search Report and Written Opinion mailed Jul. 2, 2004, for PCT/EP2004/001382; 16 pages.

Cederqvist, Per , et al., "Version Management with CVS",*Signum Support AB*, Online! 1993, XP002199439. Retrieved from Internet: URL: http://www.loria.fr/{molli/cvs/doc/cvs.ps> retrieved on May 21, 2002. 18 pages.

Chase, Jr., Robert P., et al., "Parallel Building: Experience with a CASE System for Workstation Networks", *Computer Workstations*, 1988. Proceedings CA, USA. Mar. 7-10, 1988. Washington DC, USA. IEEE Comput. Soc. Pr. US. Mar. 7, 1988, pp. 2-11. XP010011374.

* cited by examiner

METHOD AND COMPUTER SYSTEM FOR ACTIVATION OF SOURCE FILES

CROSS-REFERENCE TO RELATED APPLICATIONS

This application is a National Phase Application of International Application No. PCT/EP2004/001382, filed Feb. 13, 2004, which claims the priority of European Patent Application No. 03007527.9, filed Apr. 1, 2003. The present application claims priority from both applications.

FIELD OF THE INVENTION

The present invention generally relates to electronic data processing, and more particularly, relates to methods, computer program products and systems for file based software development.

BACKGROUND OF THE INVENTION

Many software products are built from a large number of source files that are usually written in a programming language that requires the compilation of the sources into a format that can be interpreted by computers efficiently. Often the software products are developed by large groups of software developers.

Software developers are usually equipped with computers that run integrated development environments (IDEs), such as Eclipse or Forte, to provide functionality for editing/modifying and compiling source files residing on the local hard drive of the developer's computer.

In order to allow cooperation in teams, source files are stored centrally and versioned using a source control mechanism (e.g., CVS) that contains the source files. A developer downloads source files from a source control system to his local computer, changes the source files and then stores the changed source files again in the source control system. A further developer can download the changed source files to his/her local computer by downloading them from the source control system.

To test changed source files, a developer can compile them on the local computer. To test interoperability with further source files that are changed by other developers, the developer has to compile the further changed source files as well.

Computing power of current computer hardware is insufficient to allow instant recompilation of large software products on a developer's local computer within an acceptable amount of time. Therefore, some IDEs, such as Eclipse, provide the ability to test changed source files of a software product by splitting the source files into smaller groups. These smaller groups can be compiled without a requirement to compile the software product as a whole. The smaller groups are typically referred to as projects or components. In the following description the term component is used.

Compilation and provision of distributable compilation results of the whole software product is typically performed by a central computer (e.g., a server computer). Typically, the central compilation is done after having transferred the source files of all components from the source control system to the central computer once a day, every few hours or in similar large time intervals. The central computer compiles all components and stores the compilation results. However, compiling all components even if no source files have been changed is a waste of resources of the central computer that might be usable otherwise.

Further, a developer always has to wait for the next central compilation before he/she can test the interoperability of the compilation result of a changed source file.

Further, the developer can transfer changed source files to the central computer that may cause errors in the central compilation although a previous local test compilation worked properly because of using outdated local copies of the compilation results of referenced components. If the central compilation fails each developer has to wait one more compilation interval before updating local copies of used compilation results (e.g., used libraries). If further changes of source files occur in the meantime, there is an increased probability that the central compilation fails due to these changes, because in many cases the changes have been tested against outdated libraries on local computers. This probability increases with the number of developers that work on the software product.

There is an ongoing need to reduce the number of central compilation failures.

SUMMARY OF THE INVENTION

Therefore, the present invention provides methods, computer program products and computer systems as described by the independent claims to anticipate whether changed source files will make a subsequent central compilation fail or not.

To achieve this objective a central compilation service checks any modification of inactive source files that belong to a component to identify whether the modifications are successfully compilable or not. If the compilation can be successfully completed modified inactive source files are activated and become active source files of the component.

Active source files become visible in an integrated development environment (IDE) for each software developer. It is an effect of the present invention that source files of a component can only be activated if the component is compilable.

A further effect of the present invention is to provide a general (generic) component- and dependency-format and to generate IDE-specific component definitions based on the general formats. This allows one to integrate and use any IDE in the development of large software products.

A further effect of the present invention is to provide an IDE independent compilation tool that allows one to plug-in compilation mechanisms for different programming languages, runtime systems, etc., to be used in a central compilation. Thus, a compilation can be started from within an IDE but also outside the IDE.

A further effect of the present invention is to provide a parallel build mechanism by determining subsets of components that do not depend on each other and compile modified subsets in parallel.

Embodiments of the present invention help to:

a) reduce the waiting time of a developer for getting up-to-date results from the central compilation service because compilation on request by using an incremental build mechanism eliminates the developer's dependency on a certain cyclic compilation schedule;

b) quickly notify a software developer, who changed an inactive source file causing problems for a successful central compilation;

c) reduce the number of compilation failures when using central compilation because the concept of active source files allows one to activate only changes of source code that do not cause compilation errors when compiling the corresponding component;

d) speed up the compilation of components by using a parallel build mechanism; and e) reduce the production cost of software products as a consequence of a) to d).

The aspects of the invention will be realized and attained by means of the elements and combinations particularly pointed out in the appended claims. Also, the described combination of the features of the invention is not be understood as a limitation, and all the features can be combined in other constellations without departing from the spirit of the invention. It is to be understood that both, the foregoing general description and the following detailed description are exemplary and explanatory only and are not restrictive of the invention as described.

DETAILED DESCRIPTION OF THE INVENTION

The same reference numbers are used throughout the drawings to refer to the same or like parts. Definitions of terms, as used herein after:

Active source file:
source file that was previously activated.

Inactive source file:
source file that has been edited/modified and is subject to subsequent activation.

Compilation:
translating source files into runtime files. This may also include transforming a formatted text file into a corresponding HTML file. It may also include to transform files from or to formats such as XML, forms, etc.

Activation:
transferring an inactive source file to a plurality of active source files.

Run time archive:
a pool for compilation results (runtime files) of components.

Central compilation service:
a compilation service, for example implemented as a J2EE based server-side database application, compiles source files into assemblies, such as JAR files or EAR files. A JAR file has a file format based on the ZIP file format and is used for aggregating many files into one. An Enterprise Application Archive (EAR) file has a format used for software distribution by a J2EE platform.

Figure 1:
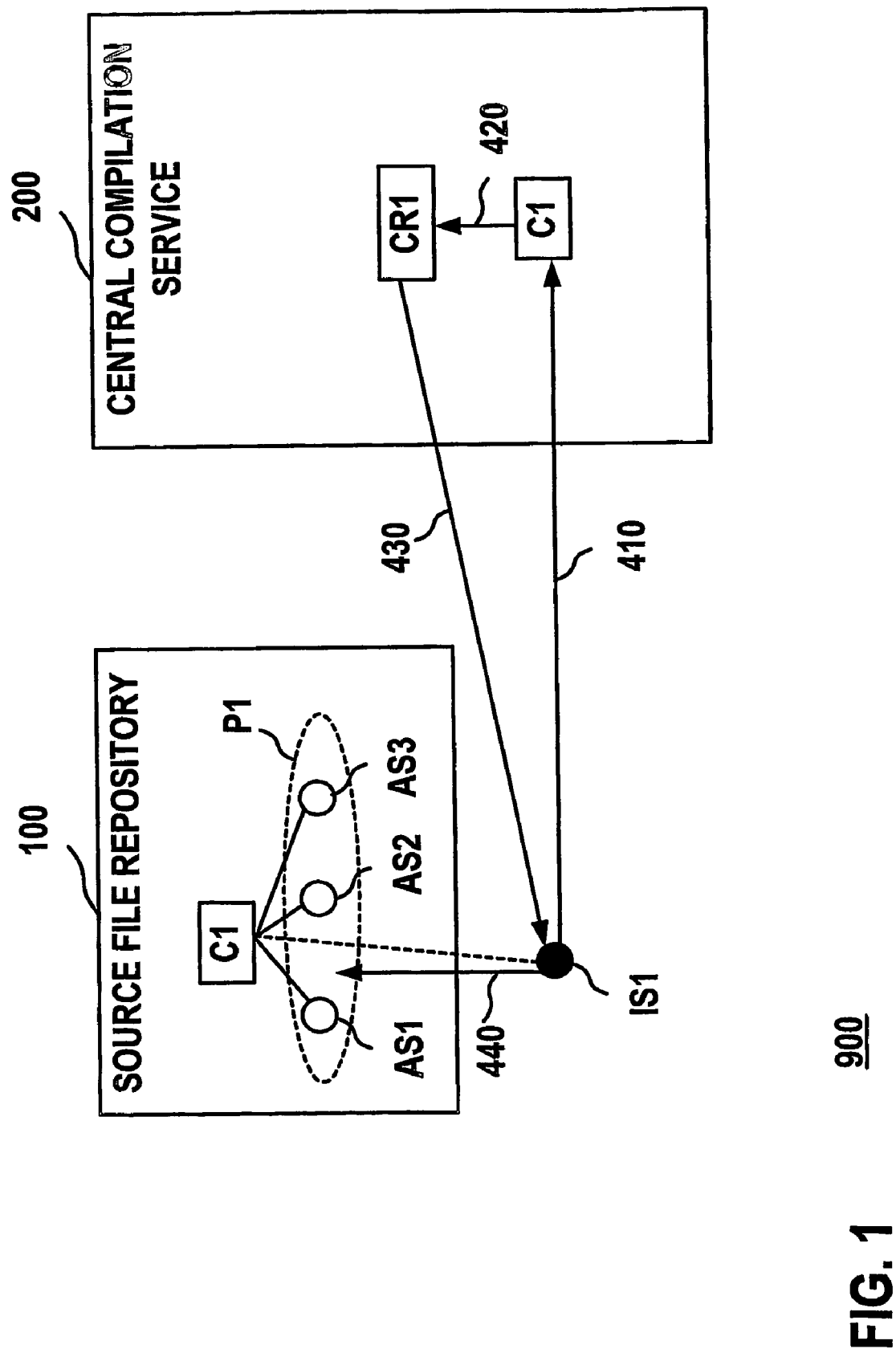
FIG. 1 is a simplified block diagram of a computer system that can be used with an embodiment of the invention for activating source files.

FIG. 1 is a simplified block diagram of a computer system 900 that can be used with an embodiment of the invention for activating source files of a component.

The computer system 900 includes a source file repository (SFR) 100 that stores a plurality P1 of active source files AS1, AS2, AS3 belonging to a component C1 (illustrated by solid connection lines between the component and each active source file of the component). For example, the SFR 100 can be implemented as a file system.

An active source file of a component is a source file that has been used in a successful compilation of the component C1 and, as a consequence, has been activated. For example, active source files can be made visible through an IDE to any user who might be interested in using any of the active source files. For example, the users are software developers, where each software developer works on a set of components. Further, active source files of a component are consistent with each other with respect to the component. That is, when the component is compiled on the base of its active source files there are no compilation errors to be expected. However, the totality of active source files in SFR 100 is not necessarily in a state that allows one the successful compilation of all contained sources. In case of component dependencies it may occur that the active source files of one component are not compatible with a further component that uses component. This allows a first software developer to intentionally introduce changes to the component that lead to incompatibilities with the further component and let a second software developer react on these changes later on, thus bringing a high degree of flexibility to the software development process.

The component C1 can also have inactive source files (e.g., inactive source file IS1), that may be stored elsewhere (illustrated by a dotted connection line between the component C1 and the inactive source file IS1). For example, the inactive source files may be stored on a local computer of a software developer. An inactive source file of the component is a source file that has been changed since the last successful compilation of the component and that has not been activated, yet. That is, an inactive source file has been created or modified after the last successful compilation of the component that includes the inactive source file. Optionally, inactive source files can be made visible through an IDE to any user who might be interested in using any of the inactive source files.

The computer system 900 further includes a central compilation service 200. For example, CCS 200 can be implemented as a server-side J2EE based database application. When the central compilation service (CCS) 200 receives 410 an activation request for at least one inactive source file IS1 of the component C1, CCS 200 compiles 420 the component C1 using the at least one inactive source file IS1. For example, a user can trigger the activation request when having completed a modification leading to the inactive source file IS1. For example, the user can execute a corresponding function to activate the inactive source file IS1. The activation request can also relate to further inactive source files that may be activated together with the inactive source file IS1.

In case the compilation is successfully completed, that is, the component C1 is successfully compiled 420 into the compilation result CR1, CCS 200 initiates 430 a transfer 440 of the at least one inactive source file IS1 to the plurality P1 of active source files. In other words, the at least one inactive source file IS1 becomes an active source file. If further inactive source files were used in the error free compilation 420, they are also transferred to the plurality P1 of active source files, thus becoming active source files.

The transfer 440 of an inactive source file can depend on various change modes.

For example, in change mode "adding", a new inactive source file has been created. Therefore, a corresponding active source file does not exist, yet. As a consequence, once the new inactive source file gets activated, a corresponding new active source file is added to the plurality P1 of active source files.

In change mode "replacing", an inactive source file (e.g., IS1) that corresponds to an active source file is modified.

When the inactive source file is activated, the corresponding active source file is replaced by the activated source file.

In change mode "deleting", an inactive source file is deleted. As a consequence, the corresponding active source file is deleted from the plurality P1 of active source files.

If multiple inactive source files are activated simultaneously, the transfer of each of the inactive source files can depend on a different change mode.

At a point in time when all inactive source files of a component are successfully activated, a user can rely on an error free compilation of the changes previously applied to the corresponding inactive source files. An inactive source file has to be activated when modified, deleted from or added to the component. The inactive source file is not necessarily consistent with the active source files of the component. Activating the inactive source file after a successful test compilation of the component including the inactive source file gives the user certainty about the consistency of the activated (previously inactive) source file with the other active source files of the component. If the test compilation is not successfully completed, the source file remains inactive.

Figure 2:
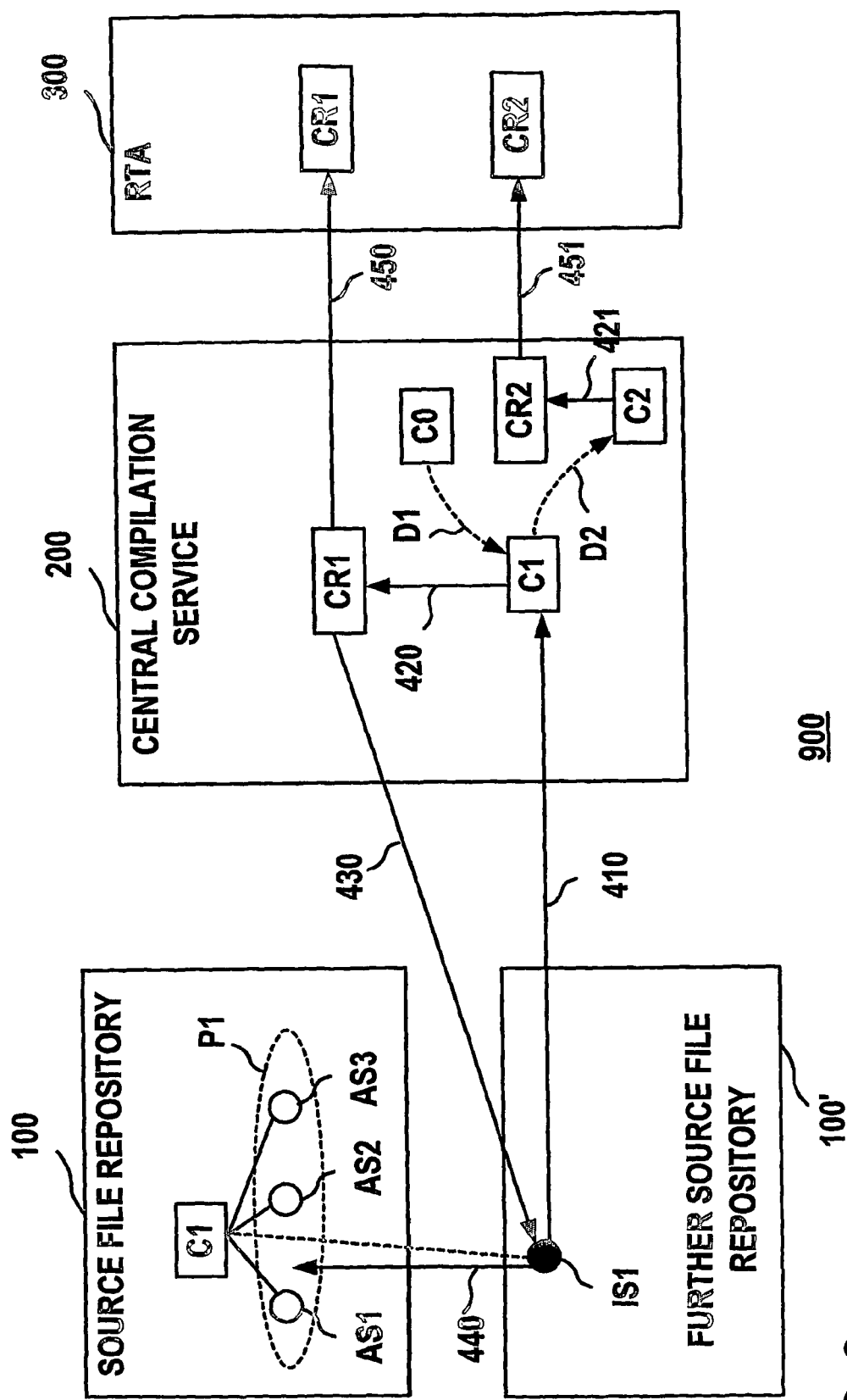
FIG. 2 illustrates a further embodiment of the computer system.

FIG. 2 illustrates a further embodiment of the computer system 900.

In the further embodiment the computer system 900 includes a runtime archive storage 300 to store 450 the compilation result CR1 of the component C1 in case the compilation of the component C1 is successfully completed. For example, when a larger portion of the software product or the software product as a whole is subject to compilation, components that have a corresponding compilation result stored in the runtime archive storage (RTA) 300 do not have to be recompiled if no activation directly or indirectly affected the components since their last compilation.

Further, the computer system 900 includes a further source file repository 100' to store the at least one inactive source file IS1. In other words, the further embodiment introduces the further SFR 100' as a development depot of inactive source files, whereas SFR 100 can be considered as a pool of active source files. Preferably, each active source file of the pool has a corresponding inactive source file in the development depot. The development depot and the pool can be part of a version control system for source files. The transfer of code changes from the development depot to the pool is tied to successful compilation of the components that are affected by the changes to be activated.

For example, a software developer checks in changes into the development depot SFR 100', that is, the software developer has edited an inactive source file (e.g., IS1). To make the changes visible to other software developers the software developer triggers an activation request for the inactive source file IS1 of the component C1. CCS 200 compiles 420 the component C1 using the inactive source file IS1.

In case of component dependencies, CCS 200 first determines all components affected by the change and then performs a test compilation of the affected components using the corresponding active source files and the inactive source files to be activated. In the example, the component C0 depends D1 on the component C1 and the component C1 depends D2 on the component C2. CCS 200 evaluates the component dependencies D1, D2. If, for example, the component C2 is also affected by the changes that are to be activated, the component C2 is also compiled 421 in response to the activation request. The compilation result CR2 of the component C2 can also be stored 451 in the RTA 300 in case of successful compilation. A further example, where the component C2 is not subject to compilation is explained in FIG. 4.

In case of successful compilation of all affected components the corresponding inactive source files are added to SFR 100, and the compilation results of the affected components are stored centrally in RTA 300.

The CCS 200 can assign a component status to each component depending on the result of the compilation. Examples of component status are:

"ready" in case the compilation of the component is successfully completed;

"broken" in case the compilation of the component fails; and

"dirty" in case the component depends on a further component and the compilation of the further component is successfully completed.

In the above component dependency example, CCS 200 assigns the component status "ready" to the components C1 and C2, whereas the component status "dirty" is assigned to the component C0 because it depends D1 on the component C1 that was successfully compiled. Components that have the component status "dirty" or "broken" will be automatically considered in a later compilation run.

In another embodiment of the invention, CCS 200 can enforce consistency of the active source files across all components of the software product.

In this embodiment the compilation of all components that depend directly or indirectly on changed components (components that include changed inactive source files) is done together with the activation of the inactive source files. In other words, an activation fails in this embodiment if any of the changed components can not be compiled or any component that directly or indirectly depends on the changed components can not be compiled. In this embodiment, for example, incompatible interface changes are activated simultaneously with the correct adaptation of all source files that make use of these interfaces.

Figure 3:
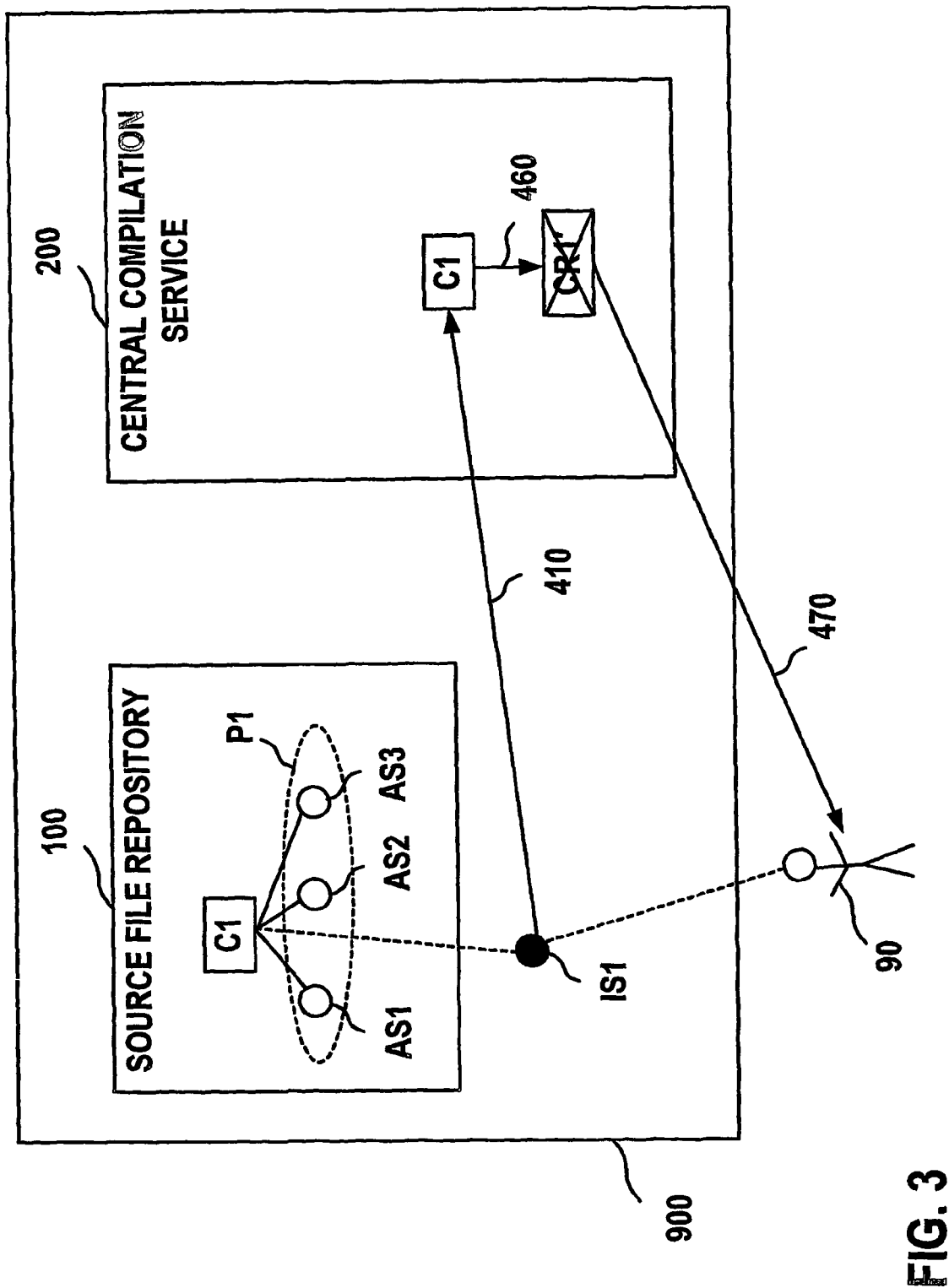
FIG. 3 illustrates notification of a user/owner by the computer system in case of compilation failure.

FIG. 3 illustrates notification of a user 90 who is the changer of the inactive source file IS1 (illustrated by dotted line) in case of compilation failure.

In this example, the inactive source file IS1 that is subject to an activation in response to an activation request is not consistent with active source files or further inactive source files being used in the (test) compilation of the corresponding component(s) C1. For example, a function signature in the inactive source file does not comply with a call of the function by an active source file within the same component, or a type of a variable in the inactive source file has been modified and does not comply anymore with the type declaration in an active source file within the same component. In this case the subsequent compilation of the component fails 460 and no compilation result is created (illustrated by crossed out CR1). Therefore, CCS 200 keeps the RTA 300 consistent with SFR 100.

CCS 200 then notifies 470 the changer 90 of the inactive source file IS1 that caused the compilation failure. If multiple inactive source files create problems and the inactive source files are owned by different users, each user can be notified accordingly. For example, CCS 200 can send a corresponding e-mail message to each user or the messages are listed in a central failure report where each user can retrieve the messages affecting his/her inactive source files.

The messages inform the users about the compilation errors and enable each user to correct the corresponding errors in the defective inactive source files before sending further activation requests.

The (test) compilation in response to the activation request allows CCS 200 to anticipate whether an inactive source file will make a subsequent central compilation fail or not. CCS 200 protects the pool of active source files from inconsistencies because an inactive source file that causes compilation errors is not activated and, therefore, not transferred to the plurality P1 of active source files.

Figure 4:
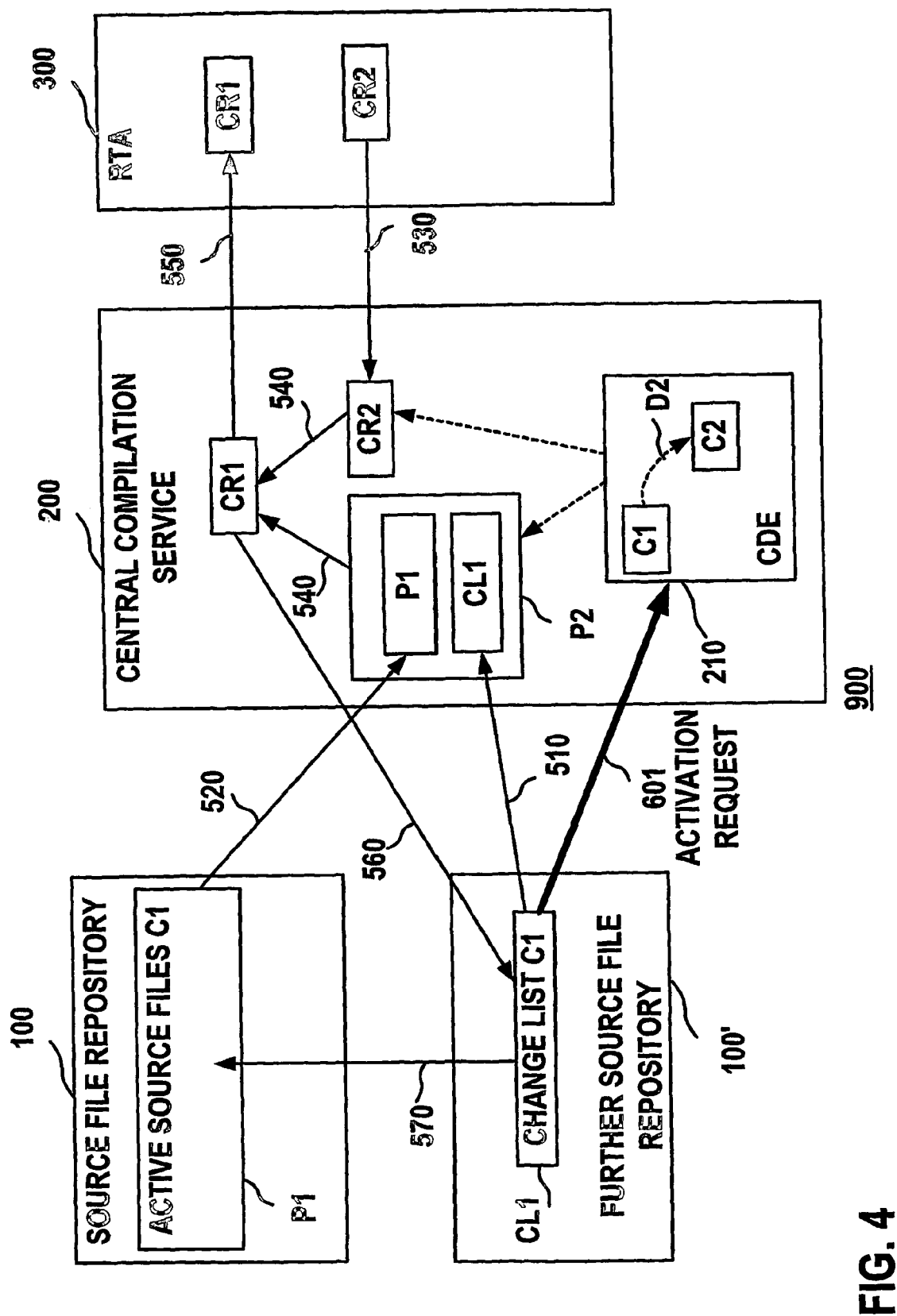
FIG. 4 illustrates the use of a change list with one embodiment of the invention.

FIG. 4 illustrates the use of a change list CL1 with one embodiment of the invention. The example of FIG. 4 is based on the embodiment described in FIG. 2, where inactive source files are stored in the further SFR 100'. Local storages on local computers can be used instead.

The change list CL1 stores representations of inactive source files that have been modified since a previous compilation of the component C1. Multiple change lists may exist. For example, there can be a change list for every user who is modifying source files. In another implementation there can be change lists by components.

CCS 200 receives the activation request 601 that targets all inactive source files having a representation in the change list CL1. CCS 200 includes a component dependency evaluator (CDE) 210 that determines, which components need to be considered when compiling the component C1 in response to the activation request 601. In the example, the component C1 depends D2 on component C2.

CDE 210 ensures that all building elements that are required for a compilation of the component C1 are provided (straight dashed arrows) to CCS 200. For example, this can be achieved by retrieving 520 the plurality P1 of active source files of C1 from SFR 100. Further, the inactive source files having a representation in the change list CL1 are loaded 510 from the further SFR 100'. For example, the loaded inactive source files overwrite, delete or replace the corresponding active source files of the plurality P1. The result is a second plurality P2 of source files that are the basis for the subsequent compilation. Further, the compilation result CR2 of the component C2 is retrieved 530 from RTA 300. As a result, CCS 200 has all building elements available to compile the component C1 into the compilation result CR1.

The compilation of the component C1 depending D2 on further components (e.g., component C2) will be referred to as "incremental build" if previously obtained compilation results (e.g., CR2) of the further components (e.g., C2) can be reused in the compilation of the component C1. In this case, only the "increment", that is, the second plurality P2 needs to be compiled. In another implementation of "incremental build" compilation results can be provided at the level of source files. In this implementation, only the inactive source files of the component C1 and those active source files whose compilation results are directly affected by the inactive source files need to be compiled. For non-affected source files the corresponding compilation result can be used. In this implementation the increments are smaller.

In another implementation of the invention, CCS 200 performs a "parallel build" when compiling the component C1. CDE 210 evaluates dependencies of the component C1 on further components. In case no dependencies exist, the component C1 and the further components can be compiled in parallel.

Because of hardware limitations, such as limited processor speed or limited data throughput of memory devices, a parallel build can be performed by a cluster of build computers. In this case, the compilation of various components is distributed on multiple computers that are all controlled by CCS 200. This allows CCS 200 to speed up the parallel build by using the processor and memory resources of all build computers simultaneously.

Figure 5:
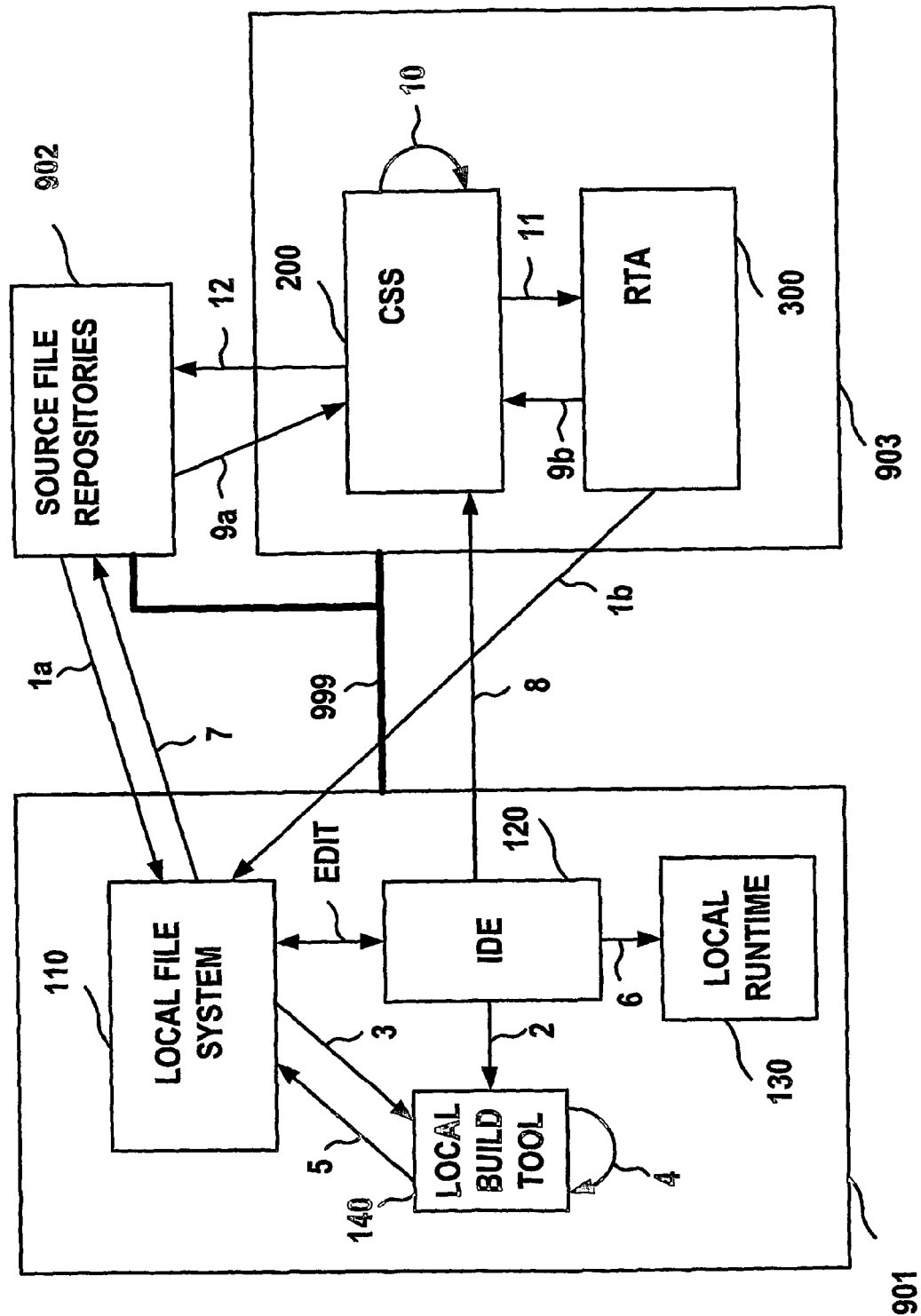
FIG. 5 is a simplified block diagram of the computer system to illustrate a software development process using the spirit of the invention.

FIG. 5 is a simplified block diagram of the computer system 900 to illustrate a software validation process using the spirit of the invention.

The separation of source files of one software product into a plurality of components usually leads to a situation where source files from one component depend on contents of other components, because there are, for example, references defined between them. To allow a developer a local compilation of a single component on his/her computer 901, the compilation results of the referenced components are usually used instead of the corresponding source files. This allows one to avoid a full recompilation of the whole software product on every developer's computer, which would occur if the source files of referenced projects were used instead of the compilation results.

Usually, a developer locally compiles only source files of a component modified by the developer. Therefore, the developer obtains 1b compilation results of referenced components from somewhere else (e.g., from RTA 300 on a central computer 903) and stores these compilation results in his/her local file system 110. The central computer 903 can communicate with the local computer 901 over a network 999, such as a local area network (LAN), wide area network (WAN) or the Internet.

Especially for larger software products it is advantageous to handle the creation and distribution of compilation results in a centralized manner. To efficiently handle these compilation results if stored locally on further local computers is difficult. Further, the central storage of the compilation results enables developers to get the compilation results of all components from one location instead of from potentially all local development computers. Centrally produced compilation results can also be used to install and test the whole software product.

A source control system can also be implemented on a central location, such as computer 902 storing source file repositories. The computer 902 can communicate with further computers of the computer system 900 over the network 999. For example, the source control system can be implemented as a file system implementing the Web-based Distributed Authoring and Versioning (WebDAV) protocol or the DeltaV protocol. The source control system can support conventional source control functions, e.g., change tracking, merging of document versions, change propagation mechanisms and automatic conflict detection, known by those skilled in the art. Change tracking means that when a version of a source file is created it is stored in an activity. An activity is the smallest granularity object for propagating changes between source file repositories. A new version that is contained in an open activity is only visible for the creator. After the activity gets checked into the source control system, the version becomes visible for everybody.

When a developer wants to edit (EDIT) a source file, the source file can be retrieved 1a from a source file repository of the source control system. In one implementation, general (generic) component- and dependency-descriptions are used for describing components and their dependencies, and these descriptions are also stored in the source control system. When retrieving source files and component descriptions from the source file repositories, the development computer 901 converts general component description formats to IDE-specific component definitions and dependency definitions that are appropriate for an IDE 120 used by the computer 901.

Then, the source file is stored in the local file system 110 and can be edited by the developer using the IDE 120. Once a source file is modified it can be transferred 2 from the IDE 120 to a local build tool 140. The local build tool 140 further retrieves 3 necessary compilation results from the local file system 110. The compilation results may have been previously obtained 1b from RTA 300. Then, the local build tool 140 locally compiles 4 components that include the modified source file(s) by using the necessary compilation results. If the local compilation is successful the new compilation result is stored 5 in the local file system 110 from where it can be deployed 6 by the IDE 120 to a local runtime 130 for test purposes.

Then, the developer can check in 7 the modified source file(s) into a source file repository in the computer 902. The modified source file(s) become inactive source file(s) that need(s) to be activated.

The developer can trigger an activation request with regards to the inactive source file(s). For example, the activation request may be launched 8 through the IDE 110 and is directed to the central computer 903 that includes CCS 200.

Once CCS 200 receives the activation request it loads 9a corresponding active or inactive source files from the source file repositories 902 and retrieves 9b corresponding compilation results from RTA 300.

Then, CCS 200 centrally compiles 10 the component(s) affected by the activation request. In case of successful central compilation 10 the compilation result(s) of the affected component(s) are made available 11 in RTA 300. Further, CCS 200 triggers 12 the activation of the successfully compiled inactive source file(s) in the source file repositories 902.

From then onwards, the modifications that were made during the editing (EDIT) activity of one developer are available on the central source file repositories and can be used by any other developer.

In case an error occurs during the (test) compilation 10, steps 11 and 12 are not executed but the error result is stored and made available to the developer(s) who are responsible for the corresponding modifications. For example, the IDE that has triggered 8 the activation request can check the status of the activation. If the activation failed the developer will recognize this and is now able to correct the problem immediately. Even if the developer does not recognize the problem (e.g., starts activation and leaves), the pool of active source files is not corrupted, because the modifications do not become effective there. As a result, all other developers working on the software product are not disturbed by failing compilations (caused by others), which increases the productivity of the software development process. In this synchronous implementation the waiting time of a developer is reduced primarily to the time of the compilation run.

In another asynchronous implementation, instead of a developer triggering 8 the activation request, a program constantly checks the source control system for new checked-in modified (inactive) source files. In this case the activation request is generated by the program, for example, if new inactive source files exist. The central (test) compilation 10 is started after having received the activation request. Additionally, the program determines from the inactive source files which components have to be compiled. This is achieved by providing the possibility to define dependencies between components. The developer's waiting time is one central compilation cycle that is determined by the intervals used by the program to check the source control system.

In both the synchronous and the asynchronous implementation repair cycles for defective components or source files is reduced from one day in a prior art scenario where a central build of all components is run overnight and errors become visible on the next day to less than an hour or even several minutes.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention claimed is:

1. A computer system comprising:
   a first source file repository storing a plurality of active source files of a component, the active source files having been activated upon transfer to the first source file repository from a second source file repository, the second source file repository storing a plurality of inactive source files of the component and not yet activated; and
   a central compilation service communicatively coupled with the first source file repository that, upon receiving an activation request for at least one inactive source file of the component, compiles the component using the at least one inactive source file and, in case the compilation is successfully completed, activates the at least one inactive source file, including initiates a transfer of the at least one inactive source file from the second source file repository to the plurality of active source files stored in the first source file repository, wherein the transfer of the at least one inactive source file is in response to replacing at least one corresponding active source file with the at least one inactive source file in case the corresponding active source file is outdated.

2. The computer system of claim 1, wherein the transfer comprises adding the at least one inactive source file to the plurality of active source files if the inactive source file has no corresponding active source file.

3. The computer system of claim 1, wherein the transfer comprises replacing at least one corresponding active source file with the at least one inactive source file if the active source file is outdated.

4. The computer system of claim 1, further comprising a runtime archive storage to store a compilation result of the component in case the compilation of the component is successfully completed.

5. The computer system of claim 1, wherein the central compilation service notifies a changer of the inactive source file in case the compilation of the component fails.

6. The computer system of claim 1, wherein the central compilation service assigns a component status to the component depending on the result of the compilation, the component status being ready in case the compilation of the component is successfully completed.

7. The computer system of claim 1, wherein the central compilation service assigns a component status to the component depending on the result of the compilation, the component status being broken in case the compilation of the component fails.

8. The computer system of claim 1, wherein the central compilation service assigns a component status of dirty to a further component that depends on the component in case the compilation of the component is successfully completed.

9. The computer system of claim 1, wherein the central compilation service performs an incremental build when compiling the component if the component has a dependency on a further component, the incremental build using a component dependency evaluator to determine the dependency and to provide a previously obtained compilation result of the further component, and to provide the at least one inactive source file and the plurality of active source files of the component.

10. The computer system of claim 1, wherein the central compilation service performs a parallel build when compiling the component by evaluating dependencies of the component on further components and compiling the component and at least one of the further components in parallel based on the dependencies.

11. The computer system of claim 10, wherein the parallel build is performed by a cluster of build computers.

12. An article of manufacture comprising instructions loaded into a memory of a computer system and executed by at least one processor of the computer system, causing the at least one processor to:
   store a plurality of active source files of a component in a first source file repository, the active source files having been activated upon transfer to the first source file repository from a second source file repository, the second source file repository storing a plurality of inactive source files of the component and not yet activated;
   receive an activation request for at least one inactive source file of the component, the inactive source file having been modified and subject to being activated; compile the component using the at least one inactive source file and the plurality of active source files, the active source files having been previously activated; and
   activate the at least one inactive source file, including initiate a transfer of the at least one inactive source file from the second source file repository to the plurality of active source files stored in the first source file repository in case the compilation is successfully completed, wherein the transfer of the at least one inactive source file is in response to replacing at least one corresponding active source file with the at least one inactive source file in case the corresponding active source file is outdated.

13. The article of claim 12 further comprising instructions loaded into the memory of the computer system and executed by the at least one processor of the computer system, causing the at least one processor to notify a changer of the inactive source file, in case the compilation fails.

14. The article of claim 12, wherein the instructions that cause the at least one processor to compile the component comprise instructions loaded into the memory of the computer system and executed by the one or more processors, causing the at least one processor to perform the compilation as an incremental build, the component having a dependency on a further component, the incremental build using a component dependency evaluator to determine the dependency and to provide a previously obtained compilation result of the further component, and to provide the at least one inactive source file and the plurality active source files of the component.

15. The article of claim 12, wherein the instructions that cause the at least one processor to compile the component comprise instructions loaded into the memory of the computer system and executed by the one or more processors, causing the at least one processor to perform the compilation as a parallel build by evaluating dependencies of the component on further components and compiling the component and at least one of the further components in parallel based on the dependencies.

16. The article of claim 15, wherein the parallel build is performed by a cluster of build computers.

17. A source file activation method comprising:
   storing a plurality of active source files of a component in a first source file repository, the active source files having been activated upon transfer to the first source file repository from a second source file repository, the second source file repository storing a plurality of inactive source files of the component and not yet activated;

receiving at a central compilation service an activation request for at least one inactive source file of a component, the inactive source file having been modified and subject to being activated;

compiling the component using the at least one inactive source file and the plurality of active source files, the active source files having been previously activated; and activating the at least one inactive source file, including initiating a transfer of the at least one inactive source file from the second source file repository to the plurality of active source files stored in the first source file repository in case the compilation is successfully completed, wherein the transfer of the at least one inactive source file is in response to replacing at least one corresponding active source file with the at least one inactive source file in case the corresponding active source file is outdated.

18. The method of claim 17 further comprising notifying a changer of the inactive source file, in case the compilation fails.

19. The method of claim 17, wherein the transfer of the at least one inactive source file comprises adding the at least one inactive source file to the plurality of active source files in case the plurality has no corresponding active source file.

20. The method of claim 17, further comprising storing a compilation result of the component in a runtime archive storage in case the compilation of the component is successfully completed.

21. The method of claim 17, further comprising:

assigning a component status to the component depending on the result of the compilation, the component status being selected from the group of:

ready in case the compilation of the component is successfully completed, and broken in case the compilation of the component fails; and assigning a component status of dirty to a further component in case the further component depends on the component and the compilation of the component is successfully completed.

22. The method of claim 17, wherein the compilation is performed as an incremental build, the component having a dependency on a further component, the incremental build using a component dependency evaluator to determine the dependency and to provide a previously obtained compilation result of the further component, and to provide the at least one inactive source file and the plurality active source files of the component.

23. The method of 17, wherein the compilation is performed as a parallel build by evaluating dependencies of the component on further components and compiling the component and at least one of the further components in parallel based on the dependencies.

24. A method for validating software comprising:

retrieving a source file of a referenced component from a source file repository of a source control system with a local file system;

obtaining a compilation result of the referenced component from a runtime archive storage with the local file system;

receiving a modification of the source file with an integrated development environment;

transferring the source file to a local build tool within the integrated development environment upon having received the modification;

retrieving the compilation result from the local file system with the local build tool;

locally compiling the component that includes the modified source file by using the compilation result of the referenced component resulting in a new compilation result of the component with the local build tool;

storing the new compilation result in the local file system;

checking in the modified source file into the source file repository, the modified source file becoming an inactive source file of the source file repository;

launching an activation request with regards to the inactive source file directed to a central compilation service;

loading the inactive source file and corresponding active source files of the component from the source file repository with the central compilation service;

retrieving the compilation result of the referenced component from the runtime archive storage;

centrally compiling the component with the central compilation service;

and triggering the activation of the successfully compiled inactive source file in the source file repository in case of successful central compilation, including transferring the inactive source file to the active source files of the component in the source file repository.

25. The method of claim 24 further comprising the integrated development environment deploying the new compilation result to a local runtime for test purposes prior to the checking in step.

26. The method of claim 24 further comprising the central compilation service making available the result of the central compilation in the runtime archive storage.

27. The method of claim 24 further comprising the central compilation service storing an error result in case an error occurs during the central compilation, and making available the error result to a changer of the inactive source file causing the error.

28. A local development computer configured to execute retrieving, obtaining, transferring, retrieving compilation result, locally compiling, storing, deploying and launching of the method according to claim 24.

* * * * *